(12) United States Patent
Dhavala et al.

(10) Patent No.: US 7,123,774 B2
(45) Date of Patent: Oct. 17, 2006

(54) SYSTEM AND METHOD FOR CODING DATA

(75) Inventors: Somasekhar Dhavala, Bangalore (IN); Frederick Wilson Wheeler, Latham, NY (US)

(73) Assignee: General Electric Company, Niskayuna, NY (US)

( * ) Notice: Subject to any disclaimer, the term of this patent is extended or adjusted under 35 U.S.C. 154(b) by 785 days.

(21) Appl. No.: 10/306,441

(22) Filed: Nov. 27, 2002

(65) Prior Publication Data

US 2004/0101203 A1 May 27, 2004

(51) Int. Cl.
*G06K 9/36* (2006.01)

(52) U.S. Cl. ...................................... 382/240; 382/232

(58) Field of Classification Search ................ 382/232, 382/240, 248; 707/1, 4, 201, 202, 100; 711/108; 348/398.1, 406.1
See application file for complete search history.

(56) References Cited

U.S. PATENT DOCUMENTS

| | | | | |
|---|---|---|---|---|
| 5,884,269 | A | | 3/1999 | Cellier et al. ................ 704/501 |
| 5,930,805 | A | * | 7/1999 | Marquis ...................... 707/201 |
| 6,389,507 | B1 | * | 5/2002 | Sherman ...................... 711/108 |
| 6,427,147 | B1 | * | 7/2002 | Marquis .......................... 707/4 |
| 6,674,911 | B1 | * | 1/2004 | Pearlman et al. ............ 382/240 |

FOREIGN PATENT DOCUMENTS

JP 401198131 A * 8/1989

OTHER PUBLICATIONS

Lu et al., "Wavelet Compression of ECG Signals by the Set Partitioning in Hierarchical Trees Algorithm", IEEE, vol. 47, No. 7, Jul.-2000, pp. 849-856.*

"Position Coding System And Method," S. Dhavala et al., U.S. Appl. No. 10/306,442, filed Nov. 27, 2002.

"Low-Complexity Waveform Coding via Alphabet and Sample-Set Partitioning," Amir Said, William A. Pearlman, from *Visual Communications and Image Processing '97*, vol. 3024, Feb. 1997, pp. 25-37.

"Space-Frequency Quantization for Wavelet Image," Z. Xiong; K. Ramachandran; M.T. Orchard;, IEEE Transactions of Image Processing, vol. 6, No. 5, May 1997, pp. 677-693.

"Universal Coding, Information, Prediction, and Estimation," Jorma Rissanen, IEEE Transactions on Information Theory, vol. IT-30, No. 4, Jul. 1984, pp. 629-636.

"Optimum Quantizer Performance for a Class of Non-Gaussian Memoryless Sources," N. Favardin; J.W. Modestino, IEEE Transaction of Information Theory, vol. 30, No. 3, May 1984, pp. 485-497.

"Optimal Pruning with Applications to Tree-Structured Source Coding and Modeling," P.A. Chou; T. Lookabaugh; R.M. Gray, IEEE Transactions on Information Theory, vol. 35, No. 2, Mar. 1989, pp. 299-315.

Search Report.

* cited by examiner

*Primary Examiner*—Anh Hong Do
(74) *Attorney, Agent, or Firm*—Jean K. Testa; Donald S. Ingraham

(57) ABSTRACT

A universal position coding method and system are provided for coding uncompressed data. Data symbols are assigned to a bin portion and a raw portion, and a data tree structure is utilized. A top down approach involves initializing a data tree based on the bit depth of the data; splitting a bin to form two separate bins based on a predetermined splitting condition; and repeating the splitting step until a terminating condition is achieved. A bottom up approach involves forming a data tree; merging two existing bins to form a new bin based on a merging condition; and repeating the merging step until a terminating condition is achieved.

52 Claims, 11 Drawing Sheets

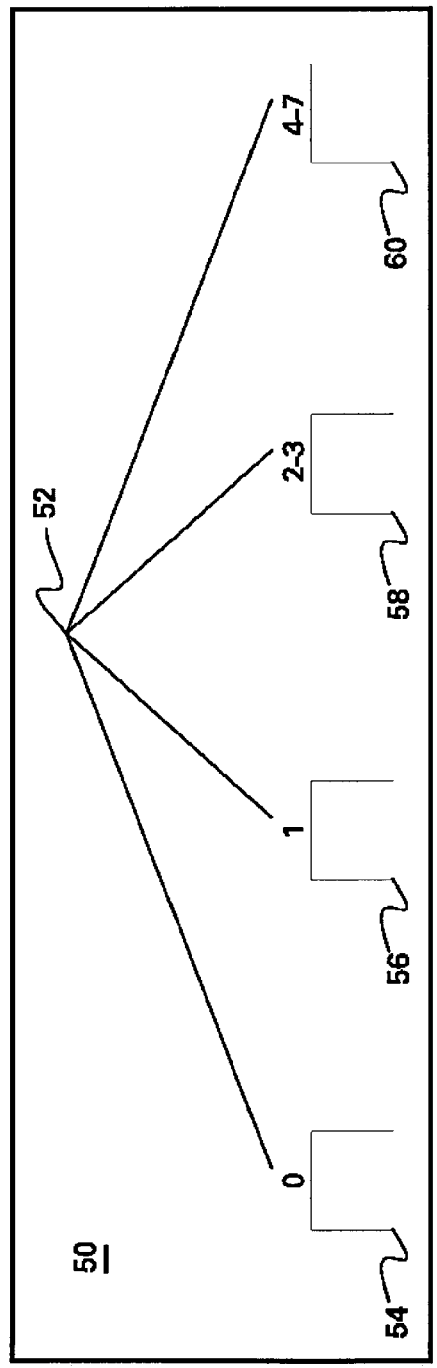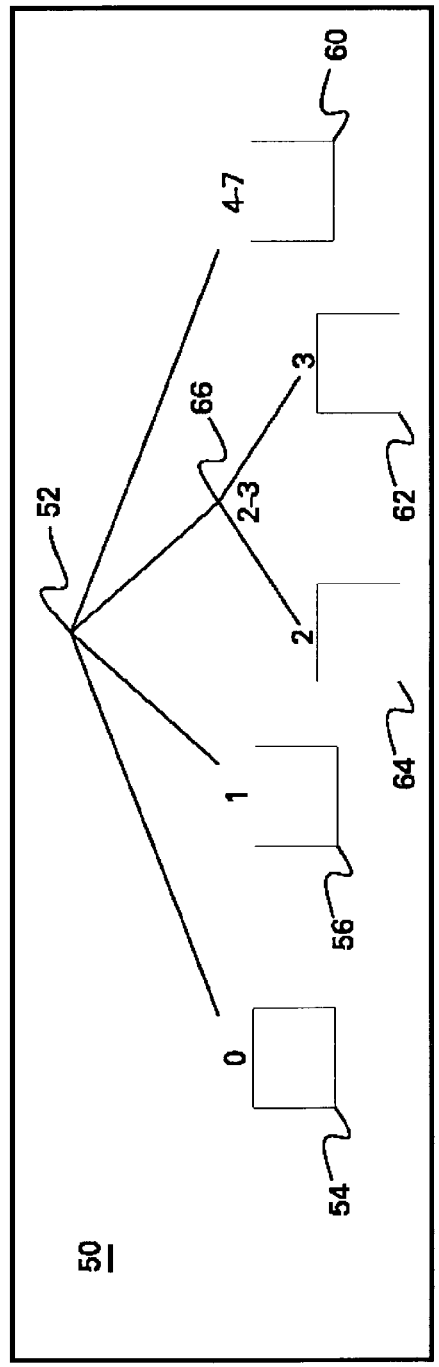

SYSTEM AND METHOD FOR CODING DATA

BACKGROUND

The invention relates generally to coding data, and more specifically to a system and method for coding and compressing data.

Compression refers to representing data using a minimum number of bits. Broadly, compression of data is of two types, namely, lossy and lossless compression. Lossless compression of data refers to that which can be completely recovered when decompressed without losing any data. Typically, in many applications, lossless compression is desirable, especially in medical images.

Typically, medical images are of high dynamic range and large spatial size. The design of coding systems is more complicated when the dynamic range of the data to be coded is relatively large, as is the case with medical images. In such cases, it is desirable to design coding and compression techniques that have low-computational cost and good compression ratio.

Accordingly, it would be desirable to provide a coding technique that can be used to code large amounts of data while maintaining low complexity and a good compression ratio.

BRIEF DESCRIPTION

Briefly, in accordance with the preferred embodiment of the present technique, a universal position coding method is described for coding uncompressed data. The method comprises generating a desired bin structure for coding data. The desired bin structure is generated using two approaches. In one embodiment, a top down approach comprises initializing a data tree based on the bit depth of the data; splitting a bin to form two separate bins based on a predetermined splitting condition; and repeating the splitting step until a terminating condition is achieved. In another embodiment, a bottom up approach comprises forming a data tree; merging two existing bins to form a new bin based on a merging condition; and repeating the merging step until a terminating condition is achieved.

In another aspect of the present invention, a data coding system is provided for coding data. The data coding system comprises a universal position coding system utilizing a data tree structure in a top down or a bottom up approach. The universal coding system is a pre-processor for an entropy encoder. The entropy encoder receives the uncompressed data and the desired bin structure and encodes the uncompressed data using the desired bin structure to generate compressed data.

DRAWINGS

These and other features, aspects, and advantages of the present invention will become better understood when the following detailed description is read with reference to the accompanying drawings in which like characters represent like parts throughout the drawings, wherein:

FIG. 3, FIG. 4 and FIG. 5 illustrate an example implementing the flow chart of FIG. 2;

DETAILED DESCRIPTION

Figure 1:
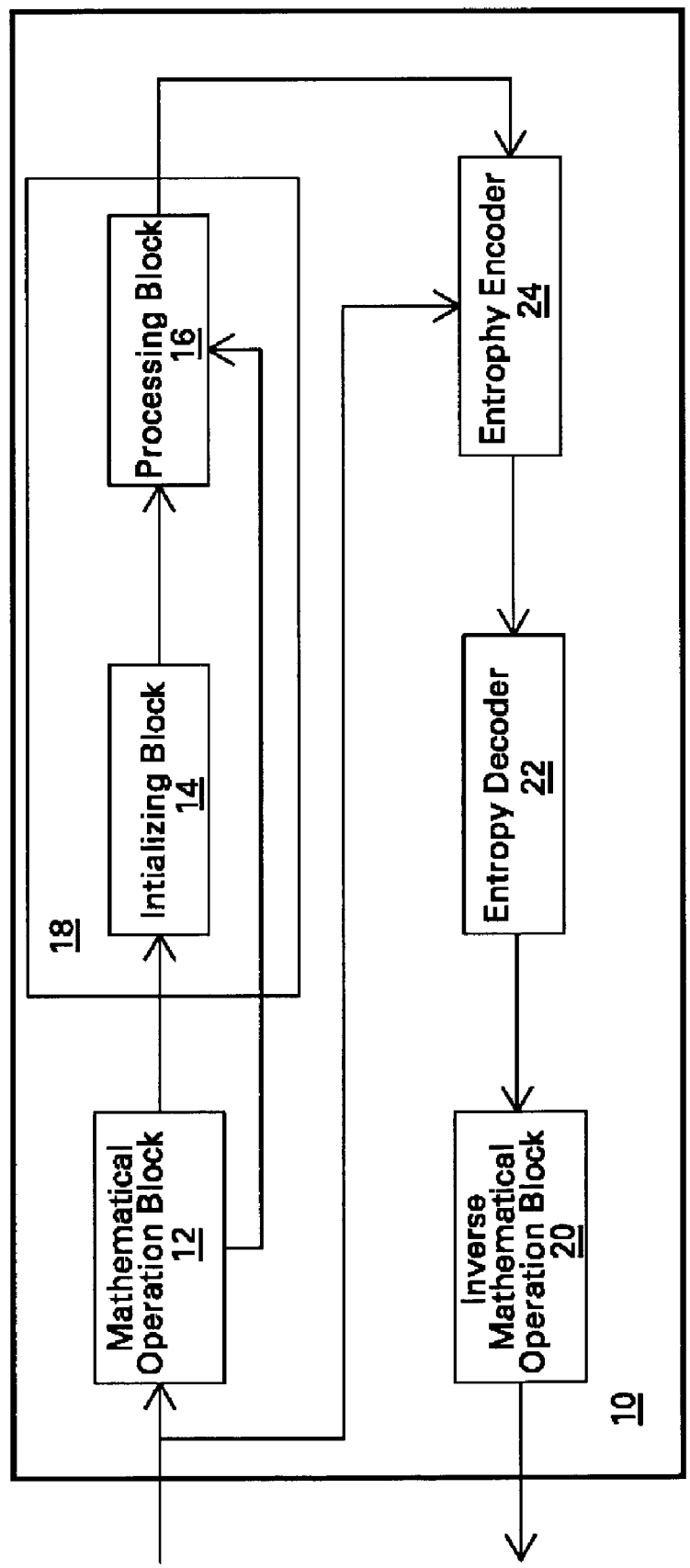
FIG. 1 is a block diagram of data coding system implemented in accordance with preferred embodiments of the invention.

FIG. 1 is a block diagram of a data coding system 10 implemented in accordance with preferred embodiments of the invention. Data coding system 10 is shown comprising a mathematical operation block 12, a universal position coding system 18, an entropy encoder 24, an entropy decoder 22 and a mathematical operation block 20. Each block is described in further detail below.

Universal position coding system 18 receives uncompressed data from transform block 12 and processes the uncompressed data using an initial bin structure to generate a desired bin structure. In the illustrated embodiment, the universal position coding system comprises initialization block 14 and processing block 16.

Entropy encoder 24 is coupled to the universal position coding system and receives the uncompressed data and the desired bin structure. The entropy encoder encodes the uncompressed data using the desired bin structure to generate corresponding compressed data. The entropy encoder also generates a data file that includes the compressed data and data representing the desired bin structure.

Entropy decoder 22 is coupled to the entropy encoder and receives the data file generated by the entropy encoder. It should be noted that the data from the entropy encoder, and more generally the data exchanged between the various functional components described herein may be formatted in any suitable manner, as in conventional "files" or in any other form that can b accessed and processed as set forth herein. Entropy decoder decodes the compressed data using the data representing the desired bin structure to generate corresponding decompressed data.

As illustrated, data coding system 10 comprises mathematical operation 12 and inverse mathematical operation 20. Mathematical operation 12 is coupled to the entropy encoder block 24 and performs a mathematical operation on the uncompressed data. By performing appropriate mathematical operations on the uncompressed data, the universal position coding system iteratively updates the initial bin structure based on certain rules and generates desired bin structure that can be used to code the uncompressed data. In one embodiment, the mathematical operation block implements an optional wavelet transform operation on the uncompressed data.

Inverse mathematical operation block 20 is coupled to the entropy decoder 22 and receives the decompressed data generated by the entropy decoder. Inverse mathematical operation block performs an inverse mathematical operation on the decompressed data. In an embodiment, inverse wavelet transform operation is implemented on the decompressed data.

In an embodiment, the uncompressed data is equivalent to the decompressed data. Thus, the data coding system recovers the uncompressed data without loss; i.e., there is lossless recovery. In an exemplary embodiment, the uncompressed data represents an images including 3D images, video images, etc.

Continuing with reference to the universal position coding system, the uncompressed data is processed to generate the desired bin structure. The manner in which the desired bin structure is generated is described below with reference to FIGS. 2 and 3.

Figure 2:
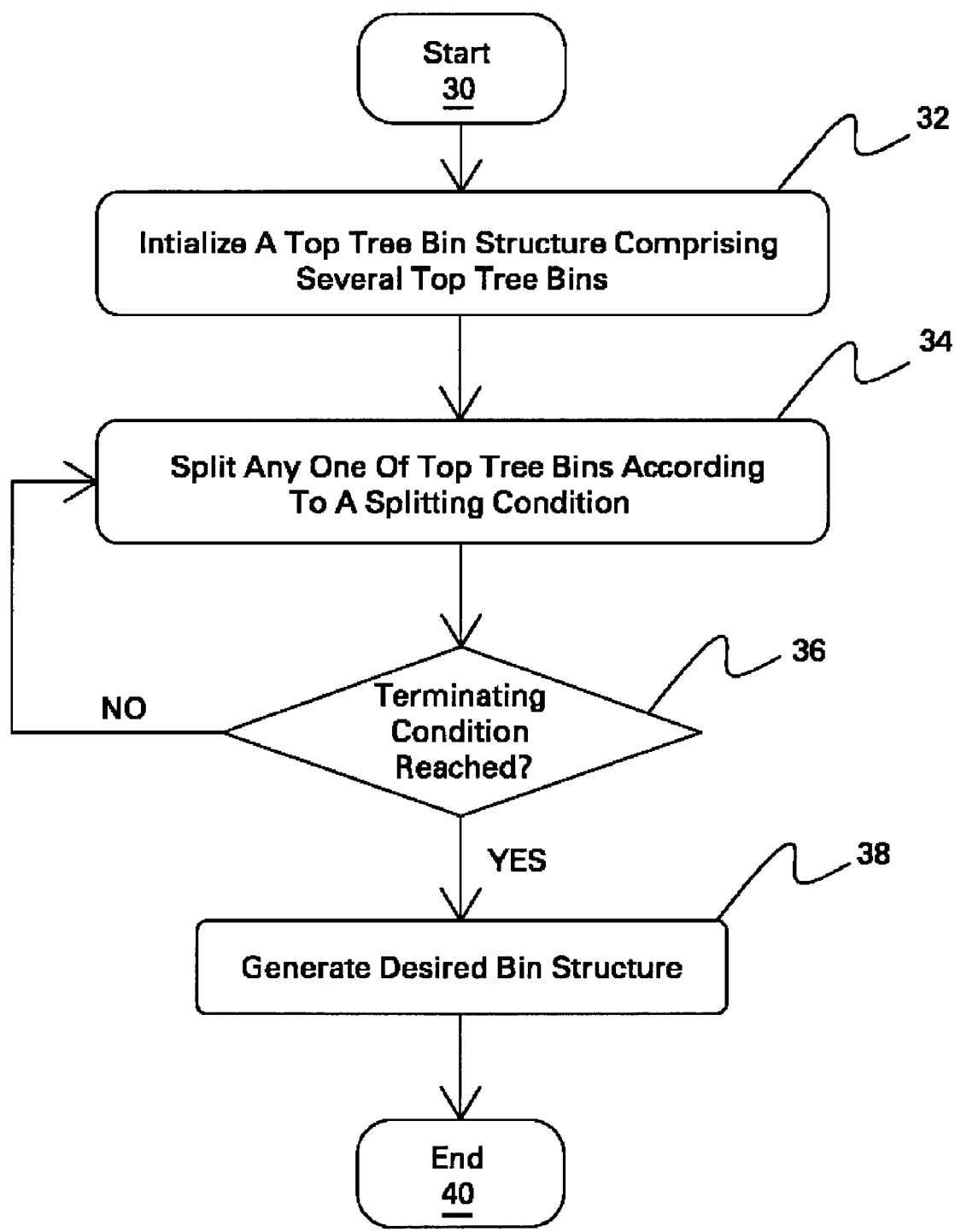
FIG. 2 is a flow chart illustrating the manner in which the desired bin structure is generated according to one embodiment of the invention.

FIG. 2 is a flow chart illustrating the manner in which the desired bin structure is generated according to one embodiment of the invention. In particular, FIG. 2 illustrates a top down approach to universal position coding in accordance with preferred embodiments of the present invention. The process begins in step 30 and control immediately passes on to step 32. Each step is described in detail below.

In step 32, a top tree bin structure is initialized. The top tree bin structure comprises several top tree bins. Each of the top tree bins comprises several top tree symbols. In an embodiment, the top tree symbols represent uncompressed data. In the illustrated embodiment, initialization block 14 initializes the top tree bin structure. In an embodiment, the top tree bin comprises the following fields.

Range_start represents the first symbol in the bin, range_end represents the last symbol in the bin and range represents the total number of symbols (magnitude only). Raw represents the bits required to represent each symbols in the bin uniquely. Count represents the total number of occurrences of all the symbols in a bin and loss represents total bits required to represent all the symbols in a bin. Mathematically, Range=(range_end−range_start+1)

Raw=log$_2$ (range),

For signed symbols (e.g. symbols representing +2 or −2)

Raw=log 2 (2*range), and

Loss=count*raw

In general, the symbols in a bin are integer values and thus, a bin represents symbols that are contiguous.

Other parameters used in designing the desired bin structure are described below.

If $P_1$ is the $i^{th}$ bin and $P_{im}$ is the $m^{th}$ child of $P_i$, the bin-information for bin $P_i$, $P_i.bi$ is given by $$P_i \cdot bi = P_i \cdot count\left(-\log_2\left(\frac{P_i \cdot count}{\sum_i P_i \cdot count}\right)\right)$$

Similarly, the bit budget of the $i^{th}$ bin, $P_i.bb$, is represented as:

$P_i.bb = P_i.bi + P_i.loss$ and the total bit-budget is given as:

$$\sum_i P_i \cdot bi + P_i \cdot loss$$

In step 34, any one of the top tree bins is split into at least two split top tree bins, based on a splitting condition. In the illustrated embodiment, processing block 16 performs steps 34. The splitting condition may be based upon various factors.

In one embodiment, the splitting condition corresponds to splitting a top tree bin of the top tree bin structure that corresponds to minimum bin information. The top tree bin corresponding to minimum bin-information is represented as $$\underset{i}{\operatorname{argmin}} P_i \cdot bi.$$

Here, $$\underset{i}{\operatorname{argmin}} P_i \cdot bi$$

means that, "i" is argument (index) of the quantity under consideration for which quantity assumes the minimum value at this argument (index). In this case, "i" is the bin number that corresponds to the bin that has minimum bin information as compared to all the other bins in the top-tree bin structure—S.

Alternatively, the splitting condition is determined by first pseudo-splitting each of said plurality of top tree bins into a several of child top tree bins, adding the bin information of each one of the child top tree bins, and subsequently splitting the top tree bin comprising several child top tree bins that correspond to a minimum increase in bin information. In the illustrated embodiment, the top tree bin is split into two child top tree bins. The bin that corresponds to minimum increase in bin information, after pseudo splitting, is calculated using the following equation:

$$\underset{i}{\operatorname{argmin}}\left[P_i \cdot bi - \sum_j P_{ij} \cdot bi\right]$$

In another embodiment, splitting condition corresponds to splitting one top tree bins that corresponds to maximum reduction in loss. The top tree bin corresponding to maximum reduction in loss is given as:

$$\underset{i}{\operatorname{argmax}} P_i \cdot loss$$

Alternatively, the splitting condition can be determined by pseudo-splitting each of the top tree bins into a several child top tree bins, adding the loss of each one of the child top tree bins, and subsequently splitting the top tree bins comprising the child top tree bins that correspond to a maximum reduction in loss. The top tree bin corresponding to maximum reduction in loss is given as:

$$\underset{i}{\operatorname{argmax}}\left[P_i \cdot loss - \sum_j P_{ij} \cdot loss\right]$$

In an alternate embodiment, the splitting condition corresponds to splitting one of the of top tree bins that corresponds to maximum bit budget. The top tree bin corresponding to maximum bit budget is represented as:

$$\underset{i}{\operatorname{argmax}}[P_i \cdot \text{loss} + P_i \cdot bi]$$

Alternately, the splitting condition can be determined by pseudo-splitting each of the top tree bins into a plurality of child top tree bins, and subsequently splitting one of the top tree bins comprising the of child top tree bins that correspond to maximum reduction in bit budget. The top tree bin corresponding to maximum reduction in bit budget is given as:

$$\underset{i}{\operatorname{argmax}}\left[P_i \cdot \text{loss} + P_i \cdot bi - \sum_j P_{ij} \cdot \text{loss} + P_i \cdot bi\right]$$

There exist various trade-off in choosing each criterion for splitting. The criterion can be categorized into operations that work directly on the bins and/or on the bins after pseudo splitting them. For example, the former criteria that work on directly on the bins does not need much of the computation and can be done by sorting a table that has the information about each bin. In the latter criteria, additional computations are required but give better results. Further, the criteria can be classified based on bin information, loss and bit-budget. For the criterion based on bin information, the entropy of the bins is considered. The entropy encoder drives the criterion. The criterion is advantageous when the loss is insignificant and is usually used in lossy compression setting. However, computing the bin information requires, relatively complex operations like calculating the logarithms. The criteria based on the loss are less complex, as they can be done by simple multiplications and updating appropriate fields of the bin structures. On the other hand, the criteria based bit-budget are computationally complex.

Finally, based the computational complexity of the algorithm, desired compression ratio and the entropy coder, a suitable criterion is selected.

In the illustrated example, for both signed and unsigned data the first top tree bin always contains top tree symbol '0'. A top tree bin which has raw equal to zero cannot be split and splitting a top tree bin results in two new split top tree bins having equal number of symbols in them (this is due to the initial top-tree bin structure chosen) and the number of symbols in the top tree bins are a power of two.

The process of splitting the top tree bins is continued till a terminating condition is reached as shown in step 36. The terminating condition may be determined by the following ways.

In an embodiment, the terminating condition determined based on said plurality of top tree bins. The terminating condition can also be determined based on an amount of distortion, wherein the distortion is a factor of the plurality of top tree symbols. The terminating condition can also be determined based on a compression ratio. Alternately, the terminating condition can be determined based on the top tree bins and the compression ratio.

In step 38, the desired bin structure is generated using the initial top tree bin structure and splitting the top tree bins as described above. In a preferred embodiment, the desired bin structure comprises the top tree bins that were not split and the split top tree bin that were not further split.

An example illustrating the manner in which the steps of FIG. 2 are implemented is described below. A four bit data (that is, bit depth equals four) is represented by the following sequence '2 2 3 4 7 0 0 1 0 2 2 3 7'. The four bit data is represented in four bins 54, 56, 58 and 60 as shown in FIG. 3. Bin 54 contains top tree symbol 0, bin 56 contains top tree symbol 1, bin 58 contains top tree symbol 2–3, bin 60 contains top tree symbol 4–7. The fields in each bin are noted below.

For bin 54, range_start equals 0, range_end equals 0, range equals 1, raw equals 0, count equals 3 and loss equals 0. Similarly, for bin 56, range_start equals 1, range_end equals 1, range equals 1, raw equals 0, and count equals 1 and loss equals 0. For bin 58 range_start equals 2, range_end equals 3, range equals 2, raw equals 2, and count equals 6 and loss equals 6. For bin 60 range_start equals 4, range_end equals 7, range equals 4, raw equals 2, and count equals 3 and loss equals 6. It may be noted that in this example, the total number of bins equals bit depth plus 1.

Figure 5:
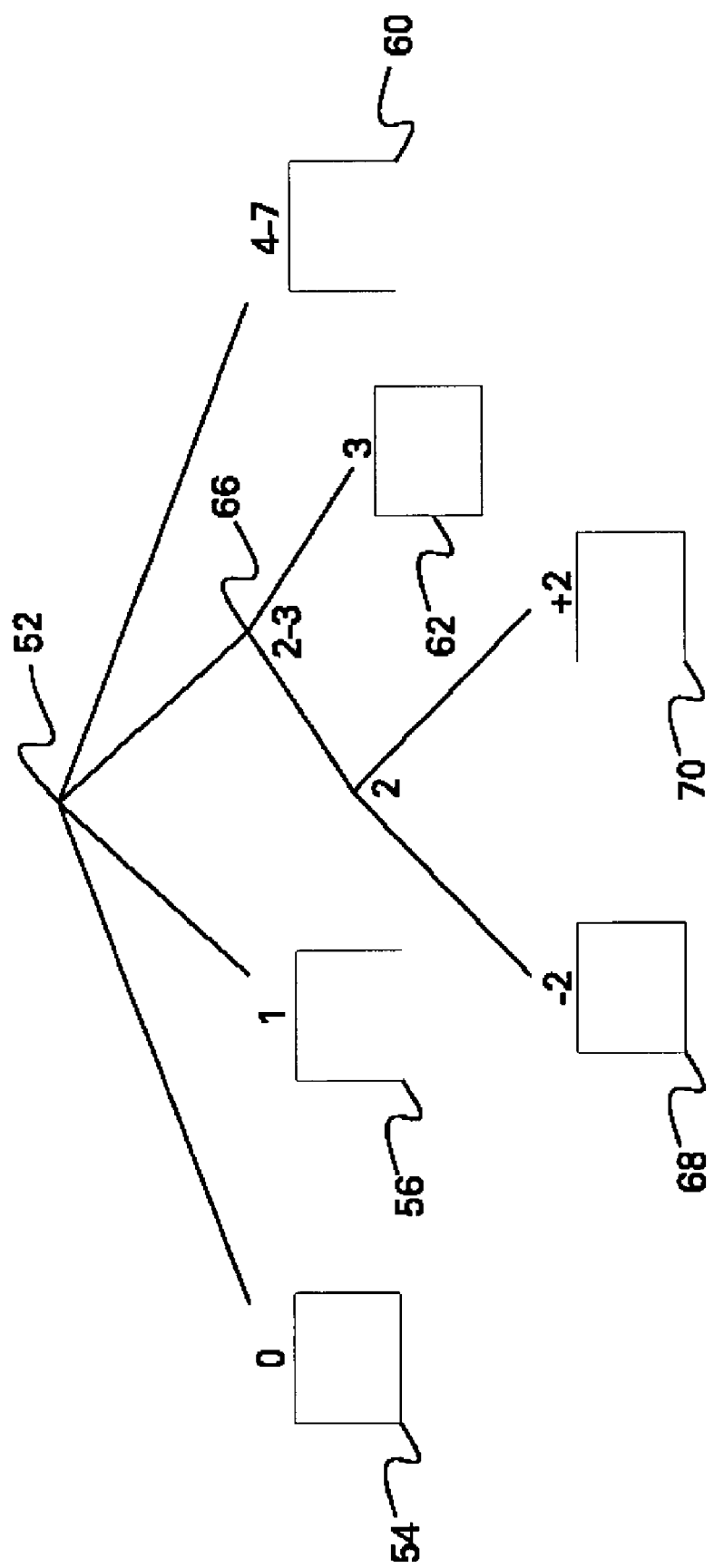

FIG. 3 represents the initial top tree structure 50. The top tree structure comprises four top tree bins 54, 56, 58 and 60 which all begin at node 52. Thus, top tree bin 58 is split into split top tree bins, 62 and 64 which meet at node 66 as shown in FIG. 4. Based on the splitting condition, split top tree bin is further split into split top tree bins 68 and 70 as shown in FIG. 5. Thus the desired bin structure generated comprises top tree bins, 54, 56, 60 and split top tree bins 64, 68 and 70 respectively.

In an alternative embodiment, a bottom up approach to universal position coding is employed. The alternate approach is described below with reference to FIGS. 6–10.

Figure 6:
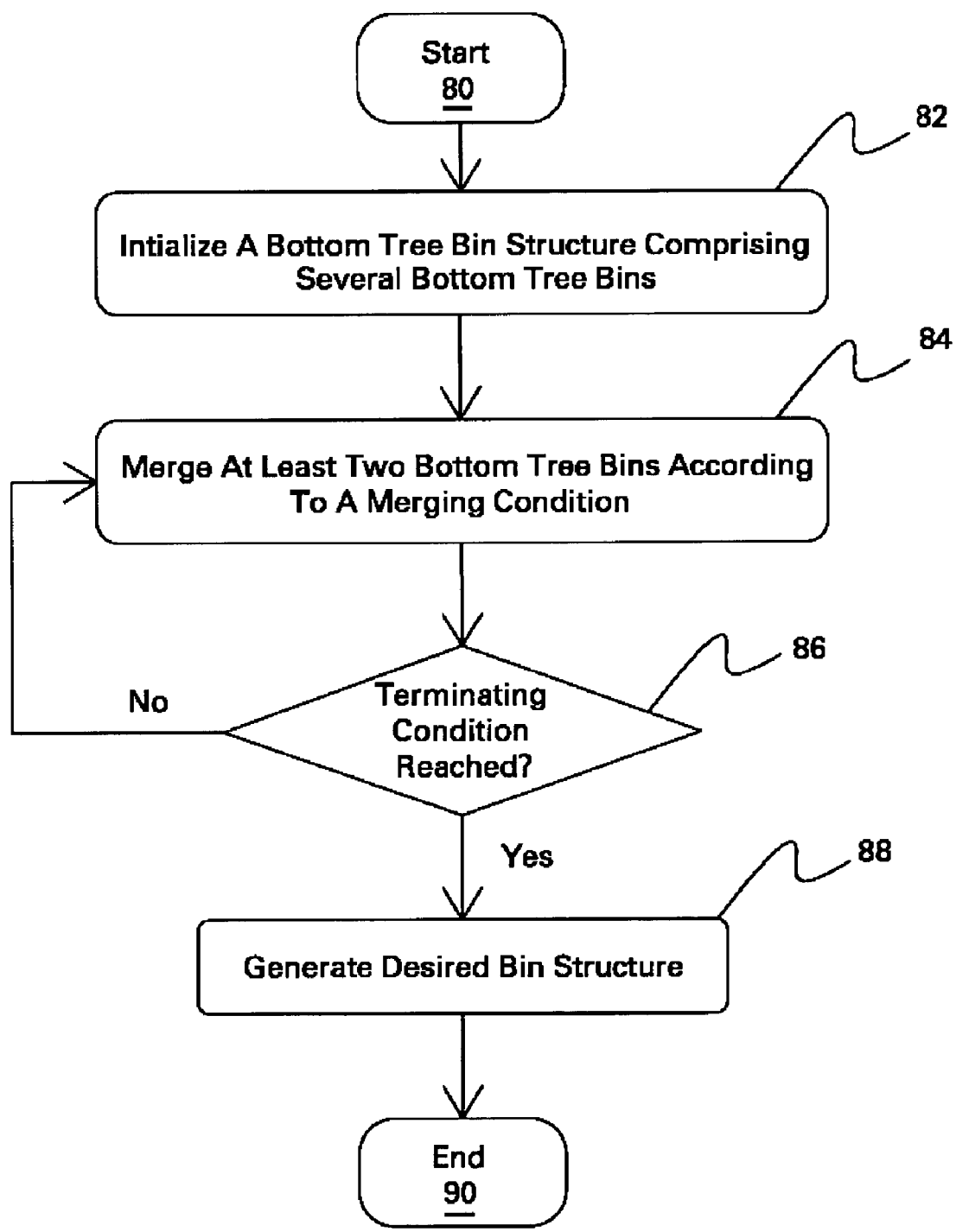
FIG. 6 is a flow chart illustrating the manner in which the desired bin structure is generated according to one embodiment of the invention.

FIG. 6 is a flow chart illustrating the manner in which the desired bin structure is generated using the bottom up approach. The process begins in step 80 and control immediately passes on to step 82. Each step is described in detail below.

In step 82, an initial bottom tree structure is initialized. The bottom tree bin structure comprises a plurality of bottom tree bins. Each of the bottom tree bins comprises several bottom tree symbols. In an embodiment, the bottom tree symbols represent uncompressed data. In the illustrated embodiment, initialization block 14 initializes the bottom tree bin structure. In an embodiment, the bottom tree bins comprises the same field as described with reference to the top tree bins.

In step 84, any two of the bottom tree bins are merged into at least one merged bottom tree bins, based on a merging condition. In the illustrated embodiment, processing block 16 performs steps 84. The merging condition may be based upon various factors. The various merging conditions are described below. Please note that $P_{i:i+n}$ is the bin formed by merging "n" consecutive bins staring from "i". In general we choose "n" to be two.

In an embodiment, the merging condition corresponds to merging two of the bottom tree bins that corresponds to maximum decrease in bin-information. The bottom tree bin corresponding to maximum decrease in bin-information is given as:

$$\underset{i:i+n}{\operatorname{argmax}}\left[P_{i:i+n} \cdot bi - \sum_{j=i}^{i+n} P_j \cdot bi\right]$$

In another embodiment, the merging condition corresponds to merging two of bottom tree bins that correspond to minimum increase in loss. The bottom tree bin corresponding to minimum increase in loss is represented as:

$$\underset{i\,i+n}{\operatorname{argmin}}\left[P_{i,i+n}\cdot\operatorname{loss}-\sum_{j=i}^{i+n}P_i\cdot\operatorname{loss}\right]$$

In yet another embodiment, the merging condition corresponds to merging two bottom tree bins that corresponds to minimum increase in bit-budget. The bottom tree bin corresponding to minimum increase in bit-budget is given as:

$$\underset{i\,i+n}{\operatorname{argmin}}\left[P_{i,i+n}\cdot\operatorname{loss}+P_{i:i+n}\cdot bi-\sum_{j=i}^{i+n}P_i\cdot\operatorname{loss}+P_i\cdot bi\right]$$

In an alternate embodiment, the merging condition corresponds to merging two of the bottom tree bins that corresponds to minimum bin-information. The bottom tree bin corresponding to minimum bin-information is given as:

$$\underset{i\,i+n}{\operatorname{argmin}}[P_{i\,i+n}\cdot bi]$$

In another embodiment, the merging condition corresponds to merging two of bottom tree bins that correspond to minimum loss. The bottom tree bin corresponding minimum loss is represented as:

$$\underset{i\,i+n}{\operatorname{argmin}}[P_{i\,i+n}\cdot\operatorname{loss}]$$

In yet another embodiment, the merging condition corresponds to merging two bottom tree bins that corresponds to minimum bit-budget. The bottom tree bin corresponding minimum bit-budget is represented as:

$$\underset{i\,i+n}{\operatorname{argmin}}[P_{i\,i+n}\cdot\operatorname{loss}+P_{i:i+n}\cdot bi]$$

The process of merging the bottom tree bins is continued until a terminating condition is reached as shown in step 86. The terminating condition may be determined by the following ways.

In an embodiment, the terminating condition is determined based on number of bottom tree bins. In another embodiment, the terminating condition determined based on an amount of distortion, where distortion is a factor of said number of bottom tree symbols. In yet another embodiment, the terminating condition is determined based on the number of bottom tree bins and the compression ratio.

In step 88, the desired bin structure is generated using the bottom tree bins and the merged bottom tree bins. In an embodiment the desired bin structure comprises the bottom tree bins that were not merged and the merged bottom tree bins that were not further merged.

Figure 7:
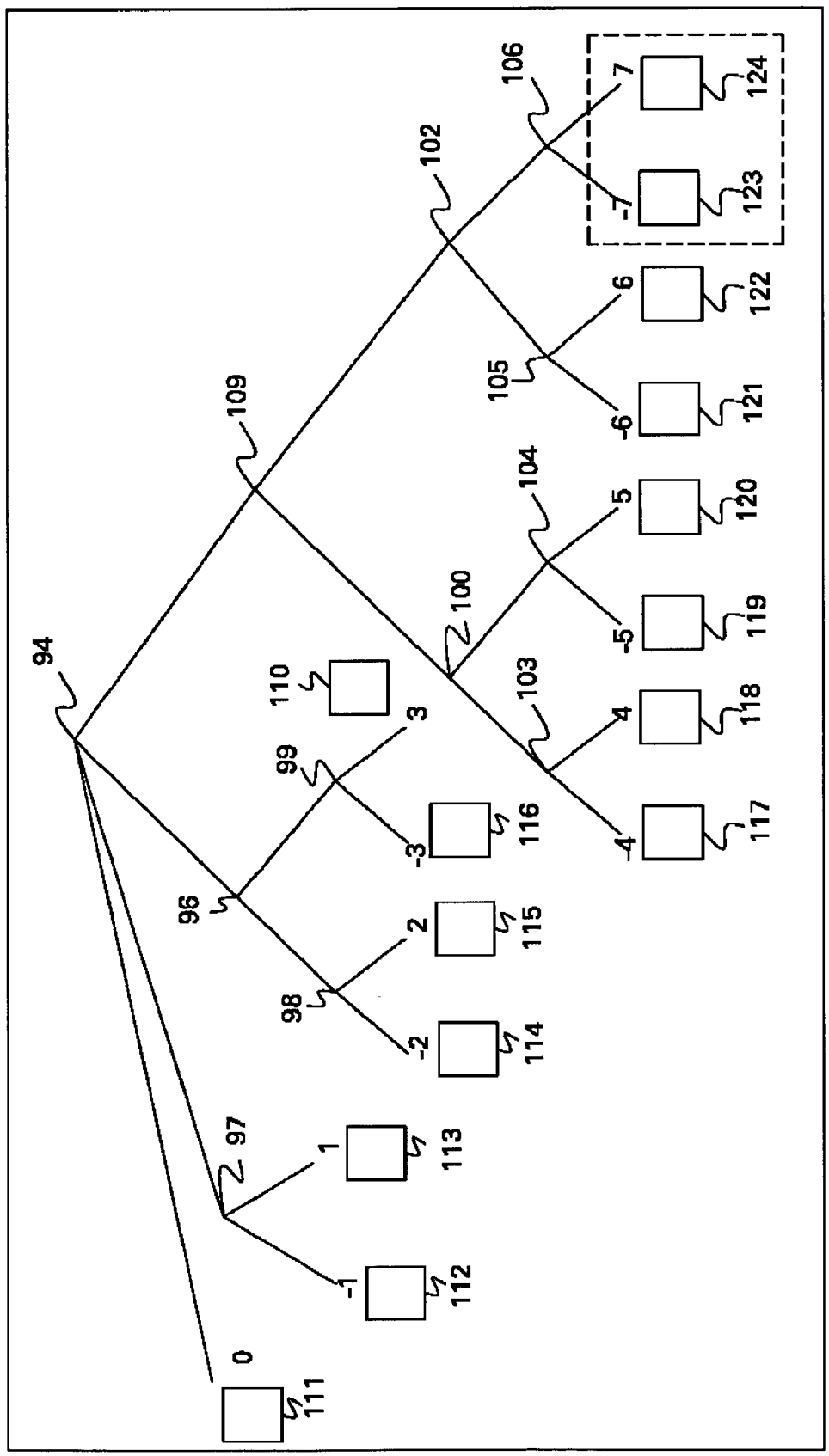
FIG. 7, FIG. 8, FIG. 9 and FIG. 10 illustrates an example implementing the flow chart of FIG. 6.

An example illustrating the manner in which the steps of FIG. 6 are implemented is described below. Uncompressed data is a 4 bit data in this example. The 4 bit data is represented in sixteen bottom tree bins 110–124 as shown in FIG. 7. Bin 110 contains bottom tree symbol 3, bin 111 contains top tree symbol 0, bin 112 contains top tree symbol −1, bin 113 contains top tree symbol 1, and so on. The fields in each bin are noted below.

Figure 8:
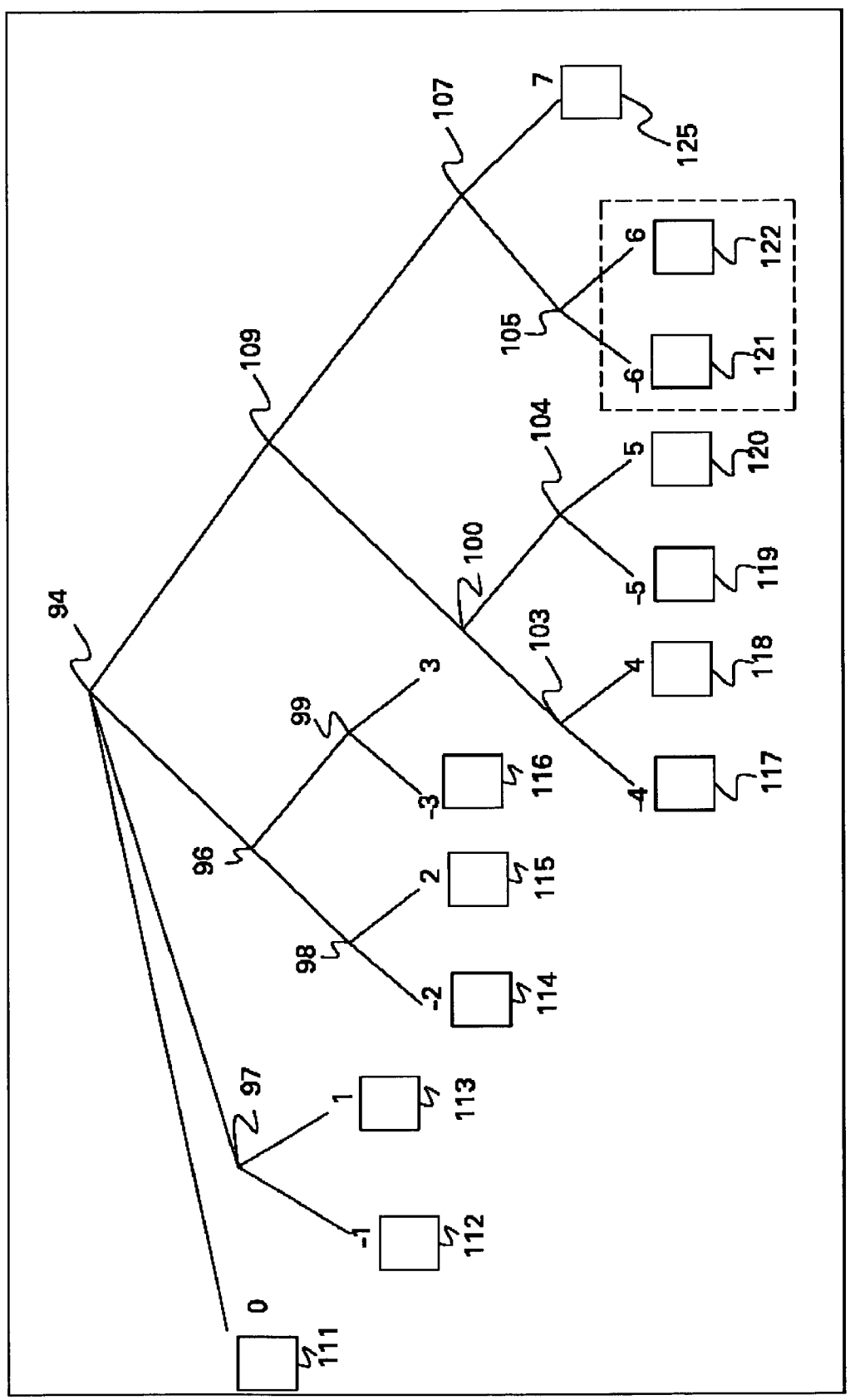
Figure 9:
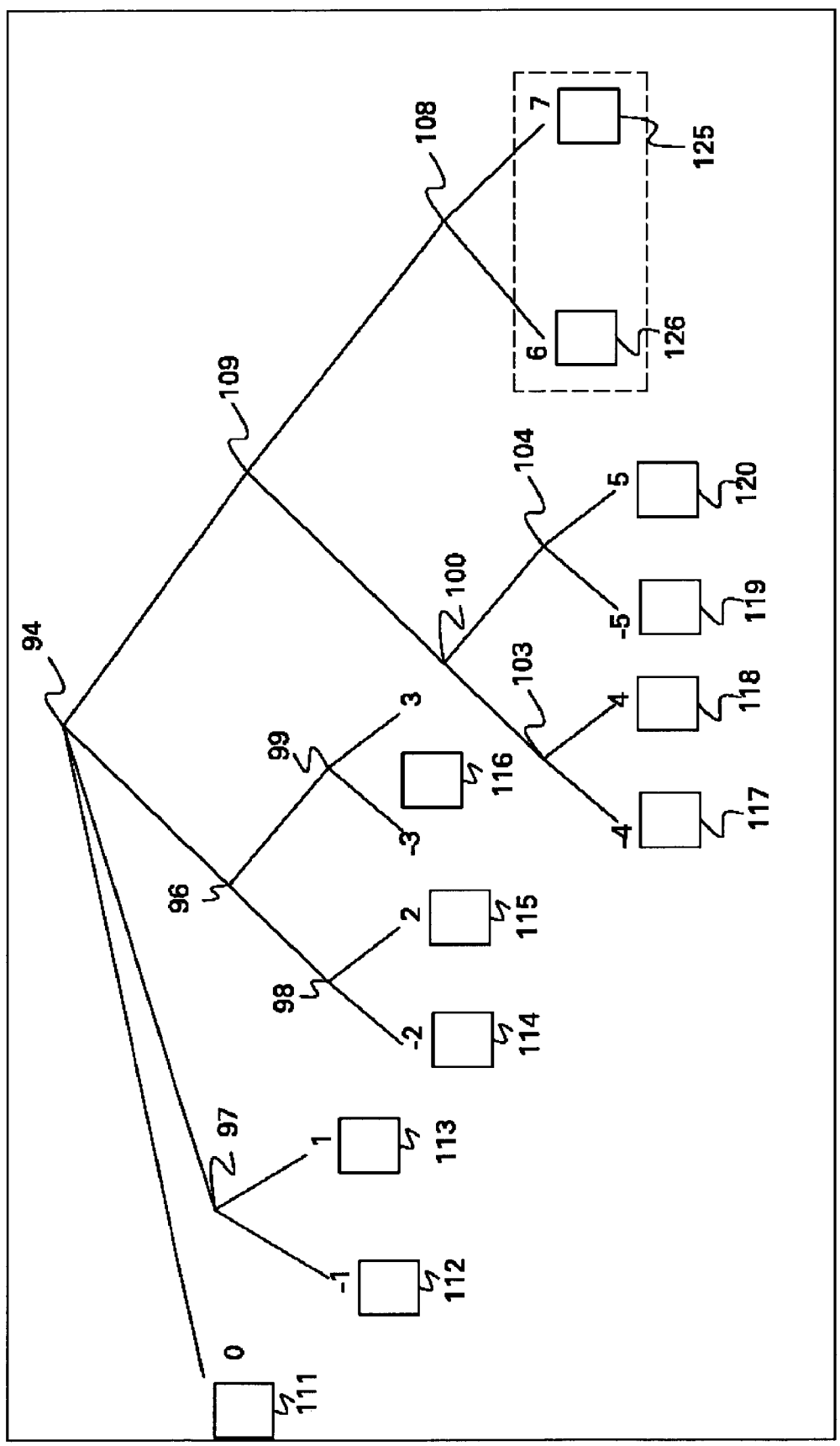
Figure 10:
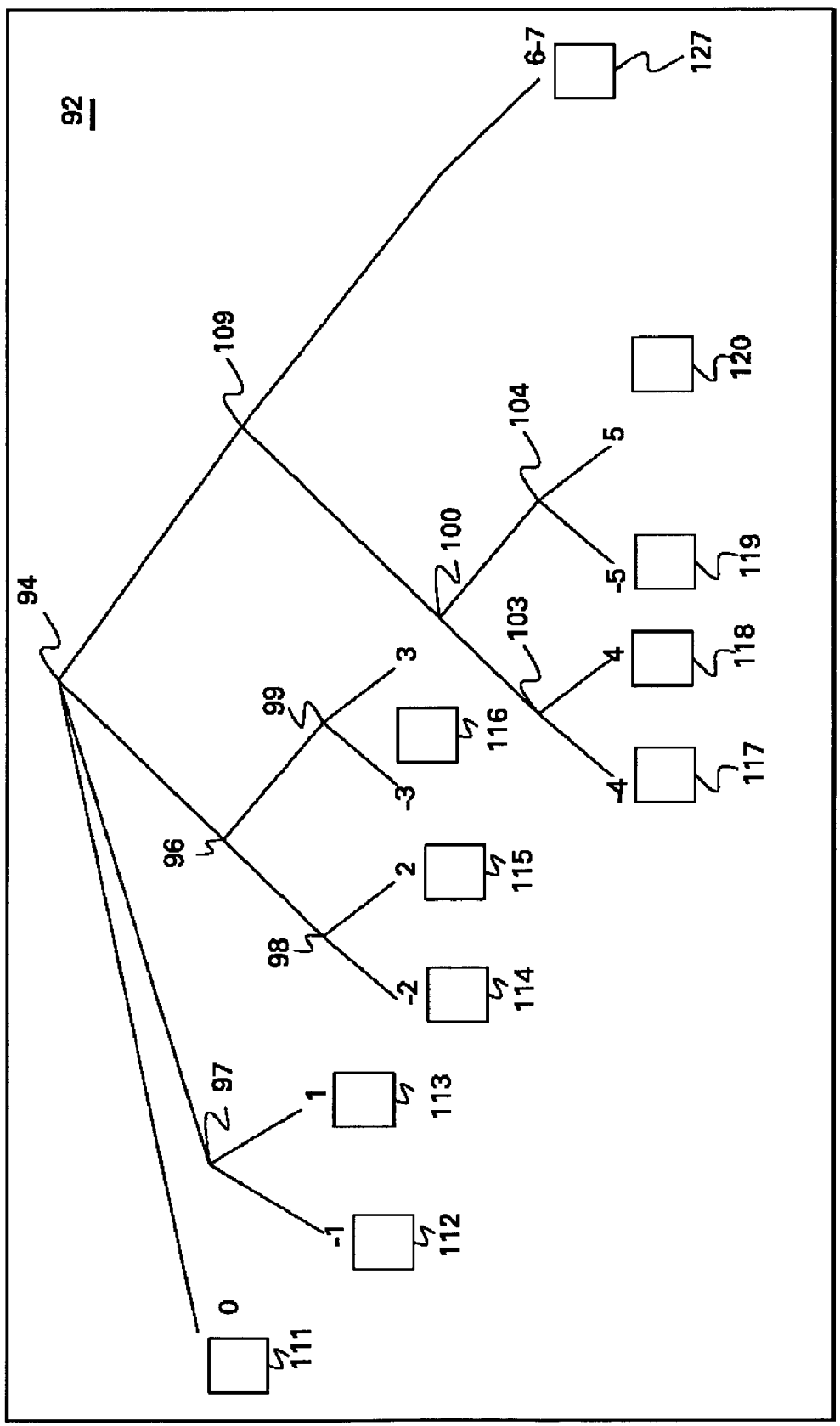

FIG. 7 thus represents the initial bottom tree structure 92. The bottom tree structure comprises fifteen bottom tree bins 110–124. Thus, bottom tree bins 123 and 124 are merged into merged bottom tree bin 125 as shown in FIG. 8. Based on the splitting condition, bottom tree bin 121 and 122 are merged into merged bottom tree 126 as shown in FIG. 9. Merged bottom trees 125 and 126 are further merged to form merged bottom tree 127 as shown in FIG. 10. Thus the desired bin structure is generated and comprises bottom 110–120 and 127. In the above embodiments, the generation of the desired bin structure is described using either a top tree bin structure or a bottom tree bin structure. Alternatively, it will be appreciated by those skilled in the art that the desired bin structure may be generated using a combination of the top tree bin structure method and bottom tree bin structure method.

The above methods of generating the desired bin structure can be implemented using a computer system. The manner in which the desired bin structure is generated using a computer system is described below in further detail.

Figure 11:
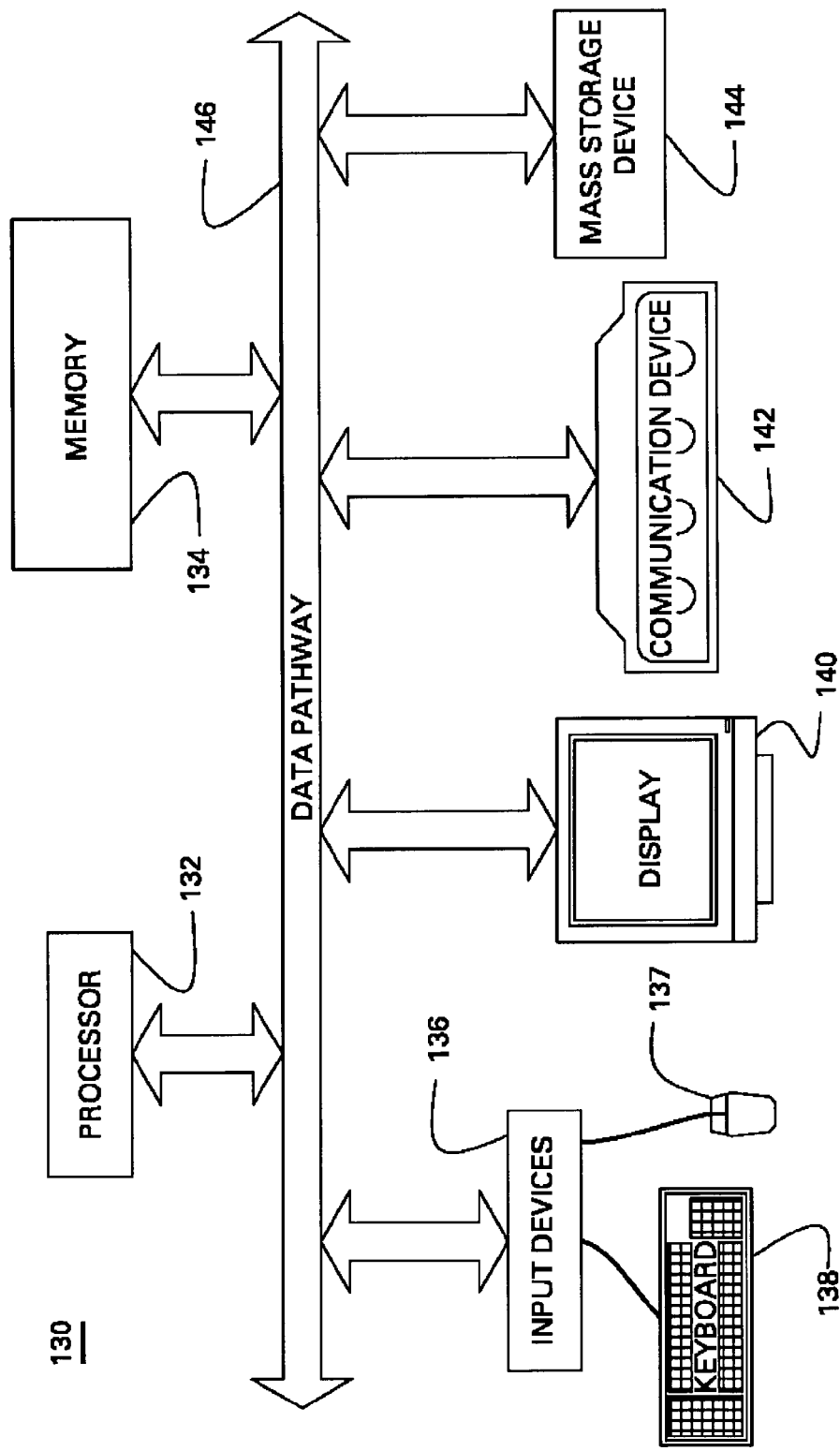
FIG. 11 is a diagrammatic representation of a general-purpose computer system used in accordance with preferred embodiments of the invention.

FIG. 11 shows a schematic of a general-purpose computer system 130 which may be used to generate the desired bin structure for coding data as described in the above method. The computer system 130 generally comprises at least one processor 132, a memory 134, input/output devices 136, and data pathways (e.g., buses) 146 connecting the processor, memory and input/output devices. The processor 132 accepts instructions and data from the memory 134 and performs various operations such as universal position coding. The processor 132 includes an arithmetic logic unit (ALU) that performs arithmetic and logical operations and a control unit that extracts instructions from memory 134 and decodes and executes them, calling on the ALU when necessary. The memory 134 generally includes a random-access memory (RAM) and a read-only memory (ROM); however, there may be other types of memory such as programmable read-only memory (PROM), erasable programmable read-only memory (EPROM) and electrically erasable programmable read-only memory (EEPROM). Also, the memory 134 preferably contains (better term?) an operating system, which executes on the processor 132. The operating system performs basic tasks that include recognizing input, sending output to output devices, keeping track of files and directories and controlling various peripheral devices.

The input/output devices may comprise a keyboard 138 and a mouse 137 that enable a user to enter data and instructions into the computer system 130. Also, a display 140 may be used to allow a user to see what the computer has accomplished. Other output devices may include a printer, plotter, synthesizer and speakers. A communication device 142 such as a telephone or cable modem or a network card such as an Ethernet adapter, local area network (LAN) adapter, integrated services digital network (ISDN) adapter, or Digital Subscriber Line (DSL) adapter, that enables the computer system 130 to access other computers and resources on a network such as a LAN or a wide area network (WAN).

A mass storage device 144 may be used to allow the computer system 130 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 130 can take the form of a hand-held digital computer, personal digital assistant computer, notebook computer, personal computer, workstation, mini-computer, mainframe computer or supercomputer.

Figure 12:
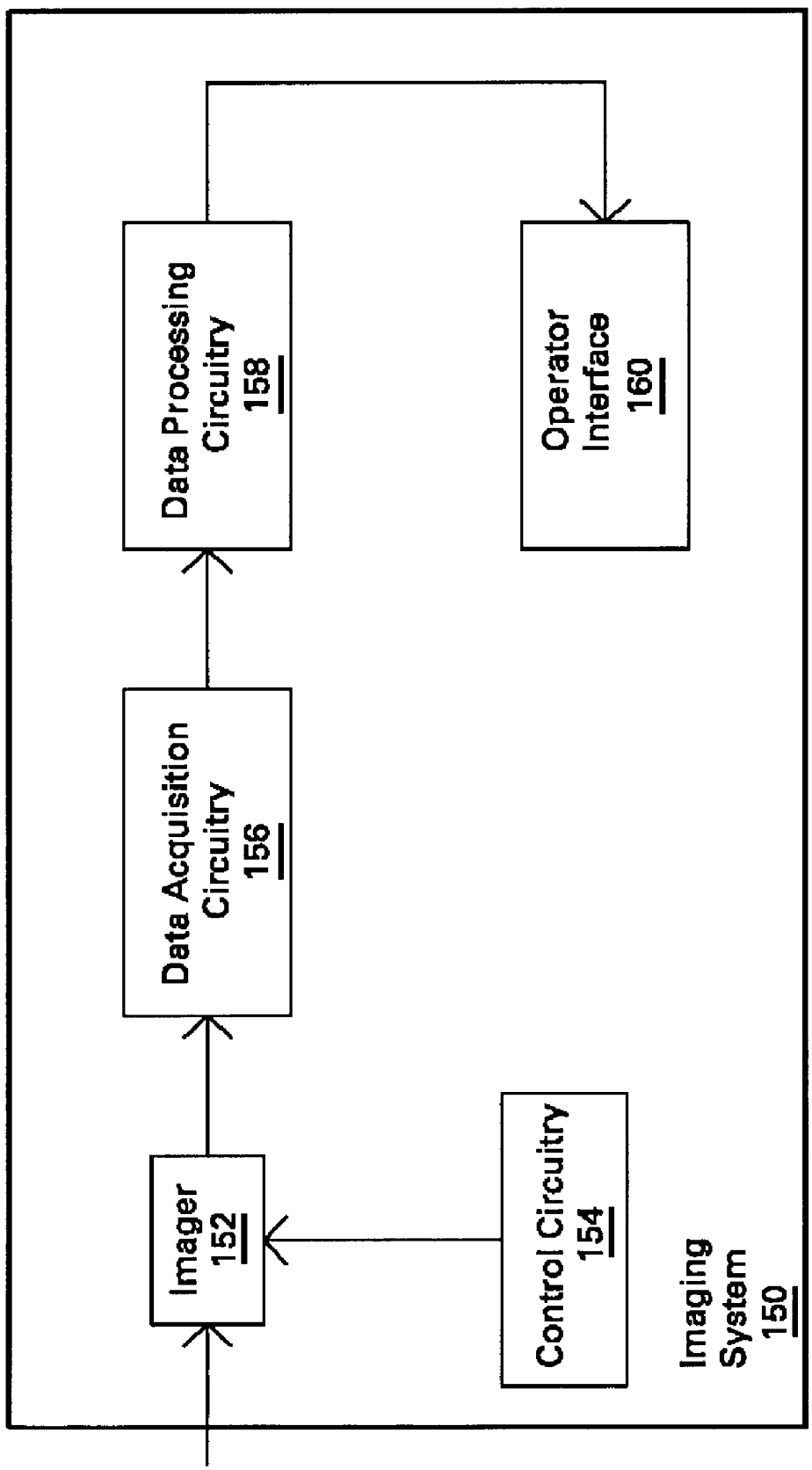
FIG. 12 is a diagrammatic representation of an exemplary imaging system utilizing a preferred implementation of the present invention.

As described hereinabove, the method for coding data may be applied to medical images. FIG. 12 provides a general overview for exemplary imaging systems to which universal position coding in accordance with preferred embodiments of the present invention may be applicable. Imaging system 150 generally includes some type of imager 152 that detects image data or signals and converts the signals to useful data. As described more fully below, the imager 152 may operate in accordance with various physical principles for creating the image data. In general, however, image data indicative of regions of interest in a patient are created by the imager either in a conventional support, such as photographic film, or in a digital medium.

The imager operates under the control of system control circuitry 154. The system control circuitry may include a wide range of circuits, such as radiation source control circuits, timing circuits, circuits for coordinating data acquisition in conjunction with patient or table of movements, circuits for controlling the position of radiation or other sources and of detectors, and so forth.

The imager 152, following acquisition of the image data or signals, may process the signals, such as for conversion to digital values, and forwards the image data to data acquisition circuitry 156. In the case of analog media, such as photographic film, the data acquisition circuitry may generally include supports for the film, as well as equipment for developing the film and producing hard copies. For digital systems, the data acquisition circuitry 156 may perform a wide range of initial processing functions, such as adjustment of digital dynamic ranges, smoothing or sharpening of data, as well as compiling of data streams and files, where desired.

The data is then transferred to data processing circuitry 158 where additional processing and analysis are performed. For conventional media such as photographic film, the data processing circuitry may apply textual information to films, as well as attach certain notes or patient-identifying information. For the various digital imaging systems available, the data processing circuitry perform substantial analyses of data, ordering of data, sharpening, smoothing, feature recognition, and so forth.

Ultimately, the image data is forwarded to some type of operator interface 160 for viewing and analysis. While operations may be performed on the image data prior to viewing, the operator interface 160 is at some point useful for viewing reconstructed images based upon the image data collected. It should be noted that in the case of photographic film, images are typically posted on light boards or similar displays to permit radiologists and attending physicians to more easily read and annotate image sequences. The images may also be stored in short or long term storage devices, for the present purposes generally considered to be included within the interface 160, such as picture archiving communication systems. The image data can also be transferred to remote locations, such as via a network.

It should also be noted that, from a general standpoint, the operator interface 160 affords control of the imaging system, typically through interface with the system control circuitry 154. Moreover, it should also be noted that more than a single operator interface 160 may be provided. Accordingly, an imaging scanner or station may include an interface which permits regulation of the parameters involved in the image data acquisition procedure, whereas a different operator interface may be provided for manipulating, enhancing, and viewing resulting reconstructed images.

The previously described embodiments of the present invention have many advantages, including achieving a trade off between the compression ratio and the complexity of the design algorithm. In other words, a less complicated algorithm is advantageously provided for coding large amounts of data while maintaining a good compression ratio.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for coding data, said method comprising:
receiving data;
initializing a top tree bin structure based on a bit depth of said data, said top tree bin structure comprising a plurality of top tree bins, each of said top tree bins comprising a plurality of top tree symbols;
splitting any one of said top tree bins into two split top tree bins based on a splitting condition; wherein said splitting condition is determined based on pseudo-splitting each of said plurality of top tree bins into a plurality of child top tree bins, said splitting step comprising:
adding bin information or loss of each one of said plurality of child top tree bins,
splitting one of said top tree bins comprising said plurality of child top tree bins that correspond to a minimum increase in bin information or a maximum reduction in loss;
repeating said splitting step until a terminating condition is reached; and
generating said desired bin structure using said plurality of top tree bins and said plurality of said split top tree bins;
coding the date using the desired bin structure.

2. The method of claim 1, wherein a top tree bin having raw equal to zero is not split.

3. The method of claim 1, wherein each one of said plurality of top tree symbols represents said data.

4. The method of claim 1, wherein said splitting condition is determined based on maximum loss.

5. The method of claim 1, wherein said splitting condition is determined based on maximum bit budget.

6. The method of claim 1, wherein said splitting step comprises:
pseudo-splitting each of said plurality of top tree bins into a plurality of child top tree bins, splitting one of said top tree bins comprising one of said plurality of child top tree bins that correspond to minimum increase in bit budget.

7. The method of claim 1, wherein a mathematical operation is a wavelet transform operation and an inverse mathematical operation is an inverse wavelet transform operation.

8. A method for coding uncompressed data, said data having a predetermined bit depth, the steps of said method, comprising:
receiving said uncompressed data;
initializing a bottom tree bin structure, said bottom tree bin structure comprising a plurality of bottom tree bins, each of said bottom tree bins comprising a plurality of bottom tree symbols; merging at least two of said plurality of bottom tree bins based on a merging condition to generate a plurality of merged bottom tree bins;

repeating said merging step until a terminating condition is reached; and generating said desired bin structure using said plurality of bottom tree bins and said plurality of said merged bottom tree bins; and coding the data using the desired bin structure.

9. The method of claim 8, wherein said merging condition is determined based on merging two of said plurality of bins that corresponds to minimum loss.

10. The method of claim 8, wherein said merging condition is determined based on merging two of said plurality of bins that corresponds to minimum bit budget.

11. The method of claim 8, wherein each one of said plurality of bottom tree symbols represents said uncompressed data.

12. The method of claim 8, further comprising:

performing a mathematical operation said uncompressed data; and performing an inverse mathematical operation on said decompressed data.

13. The method of claim 8, wherein a mathematical operation is a wavelet transform operation and said inverse mathematical operation is an inverse wavelet transform operation.

14. The method of claim 8, wherein said uncompressed data represents an image.

15. A data coding system for coding uncompressed data using a desired bin structure, the data coding system comprising:

a universal position coding system for generating a desired bin structure, said a universal position coding block comprising:

an initializing block, said initializing block configured for initializing a top tree bin structure; and a processing block coupled to said initializing block and configured to split any one of said plurality of top tree bins based on a splitting condition to generate a plurality of split top tree bins; and said processing block is further configured to split said plurality of top tree bins till a terminating condition is reached to generate said desired bin structure using said plurality of top tree bins and said plurality of said split top tree bins; wherein said splitting condition is determined based on:

pseudo-splitting each of said plurality of top tree bins into a plurality of child top tree bins, adding the bin-information or loss of each one of said plurality of child top tree bins, splitting one of said top tree bins comprising said plurality of child top tree bins that correspond to a minimum increase in bin-information or a maximum reduction in loss.

16. The data coding system of claim 15, wherein said splitting condition is determined based on pseudo-splitting each of said plurality of top tree bins into a plurality of child top tree bins, splitting one of said top tree bins comprising one of said plurality of child top tree bins that correspond to minimum increase in bit budget.

17. The data coding system of claim 15, wherein each of said plurality of top tree symbols represents said uncompressed data.

18. The data coding system of claim 15, further comprising:

a mathematical operation block coupled to an entropy encoder block, said mathematical operation block configured for performing a mathematical operation on said uncompressed data; and an inverse mathematical operation black coupled to an entropy decoder block, said inverse mathematical operation block configured for performing an inverse mathematical operation on said decompressed data.

19. The data coding system of claim 18, wherein said mathematical operation is a wavelet transform operation and said inverse mathematical operation is an inverse wavelet transform operation.

20. A data coding system comprising for coding uncompressed data using a desired bin structure, the data coding system comprising:

a universal position coding system for generating a desired bin structure, said a universal position coding block comprising:

an initializing block, initializes a bottom tree bin structure, said bottom tree bin structure comprising a plurality of bottom tree bins; wherein each of said bottom tree bins comprises a plurality of bottom tree symbols;

a processing block coupled to said initializing block; said processing block merges at least two of said plurality of bottom tree bins based on a merging condition to generate a plurality of merged bottom tree bins; and said processing block further merges said plurality of bottom tree bins till a terminating condition is reached; and said processing block generates said desired bin structure using said plurality of bottom tree bins and said plurality of said merged bottom tree bins.

21. The data coding system of claim 20, wherein the merging condition is determined based on merging at least two of said plurality of bottom tree bins that corresponds to maximum reduction in bin information.

22. The data coding system of claim 20, wherein the merging condition is determined based on merging at least two of said plurality of bottom tree bins that corresponds to minimum increase in loss.

23. The data coding system of claim 20, wherein the merging condition is determined based on merging at least two of said plurality of bottom tree bins that corresponds to minimum increase in bit budget.

24. The data coding system of claim 20, wherein each one of said plurality of bottom tree symbols represents said uncompressed data.

25. A computer-readable medium storing computer instructions for instructing a computer system to code uncompressed data, the computer instructions including:

initializing a top tree bin structure, said top tree bin structure comprising a plurality of top tree bins; wherein each of said top tree bins comprises a plurality of top tree symbols;

splitting said any one of said plurality of top tree bins based on a splitting condition to generate a plurality of split top tree bins;

further splitting said plurality of top tree bins till a terminating condition is reached; and initializing a bottom tree bin structure, said bottom tree bin structure comprising a plurality of bottom tree bins; wherein each of said bottom tree bins comprises a plurality of bottom tree symbols;

merging at least two of said plurality of bottom tree bins based on a merging condition to generate a plurality of merged bottom tree bins;

further merging said plurality of bottom tree bins till a terminating condition is reached; and generating a desired bin structure using said plurality of top tree bins, said plurality of split top tree bins, said plurality of bottom tree bins and said plurality of merged bottom tree bins.

26. The computer-readable medium of claim 25, wherein each of said plurality of top tree symbols represents said uncompressed data.

27. The computer-readable medium of claim 25, wherein each one of said plurality of bottom tree symbols represents said uncompressed data.

28. The computer-readable medium of claim 25, further comprising:

performing a mathematical operation said uncompressed data; and performing an inverse mathematical operation on said decompressed data.

29. The computer-readable medium of claim 28, wherein said mathematical operation is a wavelet transform operation and said inverse mathematical operation is an inverse wavelet transform operation.

30. The computer-readable medium of claim 25, wherein said uncompressed data represents an image.

31. A method for generating a desired bin structure to code an uncompressed date, said method comprising:

initializing a top tree bin structure, said top tree bin structure comprising a plurality of top tree bins; wherein each of said top tree bins comprises a plurality of top tree symbols;

splitting said any one of said plurality of top tree bins based on a splitting condition to generate a plurality of split top tree bins;

further splitting said plurality of top tree bins till a terminating condition is reached; and initializing a bottom tree bin structure, said bottom tree bin structure comprising a plurality of bottom tree bins; wherein each of said bottom tree bins comprises a plurality of bottom tree symbols;

merging at least two of said plurality of bottom tree bins based on a merging condition to generate a plurality of merged bottom tree bins;

further merging said plurality of bottom tree bins till a terminating condition is reached;

generating a desired bin structure using said plurality of top tree bins, said plurality of split top tree bins, said plurality of bottom tree bins and said plurality of merged bottom tree bins; and coding the uncompressed data using the desired bin structure.

32. The method of claim 31 further comprising:

initializing a top tree bin structure based on the bit depth of said data, said top tree bin structure comprising a plurality of top tree bins, each of said top tree bins comprising a plurality of top tree symbols;

splitting any one of said top tree bins into two split top tree bins based on a splitting condition;

repeating said splitting step until a terminating condition is reached; and generating said desired bin structure using said plurality of top tree bins and said plurality of said split top tree bins.

33. The method of claim 32, wherein a top tree bin having raw equal to zero is not split.

34. The method of claim 32, wherein each one of said plurality of top tree symbols represents said uncompressed data.

35. The method of claim 32, wherein said splitting condition is determined based on pseudo-splitting each of said plurality of top tree bins into a plurality of child top tree bins, said splitting step comprising:

adding the bin information of each one of said plurality of child top tree bins, splitting one of said top tree bins comprising said plurality of child top tree bins that correspond to a minimum increase in bin information.

36. The method of claim 32, wherein said splitting condition is determined based on maximum loss.

37. The method of claim 32, wherein said splitting condition is determined based on pseudo-splitting each of said plurality of top tree bins into a plurality of child top tree bins, said splitting step comprising:

adding the loss of each one of said plurality of child top tree bins, splitting one of said top tree bins comprising said plurality of child top tree bins that correspond to a maximum reduction in loss.

38. The method of claim 32, wherein said splitting condition is determined based on maximum bit budget.

39. The method of claim 32, wherein said splitting step comprises:

pseudo-splitting each of said plurality of top tree bins into a plurality of child top tree bins, splitting one of said top tree bins comprising one of said plurality of child top tree bins that correspond to minimum increase in bit budget.

40. The method of claim 32, wherein a mathematical operation is a wavelet transform operation and an inverse mathematical operation is an inverse wavelet transform operation.

41. The method of claim 31, wherein said merging condition is determined based on merging two of said plurality of bins that corresponds to minimum loss.

42. The method of claim 31, wherein said merging condition is determined based on merging two of said plurality of bins that corresponds to minimum bit budget.

43. The method of claim 31, wherein each one of said plurality of bottom tree symbols represents said uncompressed data.

44. The method of claim 31, further comprising:

performing a mathematical operation said uncompressed data; and performing an inverse mathematical operation on said decompressed data.

45. The method of claim 31, wherein a mathematical operation is a wavelet transform operation and said inverse mathematical operation is an inverse wavelet transform operation.

46. The method of claim 31, wherein said uncompressed data represents an image.

47. A system for coding uncompressed data, said system comprising:

means for initializing a top tree bin structure, said top tree bin structure comprising a plurality of top tree bins; wherein each of said top tree bins comprises a plurality at top tree symbols; and means for splitting said any one of said plurality of top tree bins based on a splitting condition to generate a plurality of split top tree bins;

means for further splitting said plurality of top tree bins till a terminating condition is reached; and means for initializing a bottom tree bin structure, said bottom tree bin structure comprising a plurality of bottom tree bins; wherein each of said bottom tree bins comprises a plurality of bottom tree symbols;

means for merging at least two of said plurality of bottom tree bins based on a merging condition to generate a plurality of merged bottom tree bins;

means for further merging said plurality of bottom tree bins till a terminating condition is reached; and means for generating a desired bin structure using said plurality of top tree bins, said plurality of split top tree bins, said plurality of bottom tree bins and said plurality of merged bottom tree bins.

48. The system of claim 47, wherein each of said plurality of top tree symbols represents said uncompressed data.

49. The system of claim 47, wherein each one of said plurality of bottom tree symbols represents said uncompressed data.

50. The system of claim 47, further comprising:

means for performing a mathematical operation said uncompressed data; and means for performing an inverse mathematical operation on said decompressed data.

51. The system of claim 50, wherein said mathematical operation is a wavelet transform operation and said inverse mathematical operation is an inverse wavelet transform operation.

52. The system of claim 47, wherein said uncompressed data represents an image.

* * * * *

UNITED STATES PATENT AND TRADEMARK OFFICE
CERTIFICATE OF CORRECTION

| | | |
|---|---|---|
| PATENT NO. | : 7,123,774 B2 | Page 1 of 1 |
| APPLICATION NO. | : 10/306441 | |
| DATED | : October 17, 2006 | |
| INVENTOR(S) | : Dhavala et al. | |

It is certified that error appears in the above-identified patent and that said Letters Patent is hereby corrected as shown below:

Col. 10, Line 18 should read as follow:

1. A method for coding data, said method comprising:
   receiving data;

initializing a top tree bin structure based on the bit depth of said data, said top tree bin structure comprising a plurality of top tree bins, each of said top tree bins comprising a plurality of top tree symbols;

splitting any one of said top tree bins into two split top tree bins based on a splitting condition; wherein said splitting condition is determined based on pseudo-splitting each of said plurality of top tree bins into a plurality of child top tree bins, said splitting step comprising:

adding the bin information or loss of each one of said plurality of child top tree bins,
   splitting one of said top tree bins comprising said plurality of child top tree bins that correspond to a minimum increase in bin information or a maximum reduction in loss;

repeating said splitting step until a terminating condition is reached; and
   generating said desired bin structure using said plurality of top tree bins and said plurality of said split top tree bins;
   coding the data using the desired bin structure.

Signed and Sealed this

Thirteenth Day of March, 2007

JON W. DUDAS
*Director of the United States Patent and Trademark Office*